Patented Mar. 16, 1943

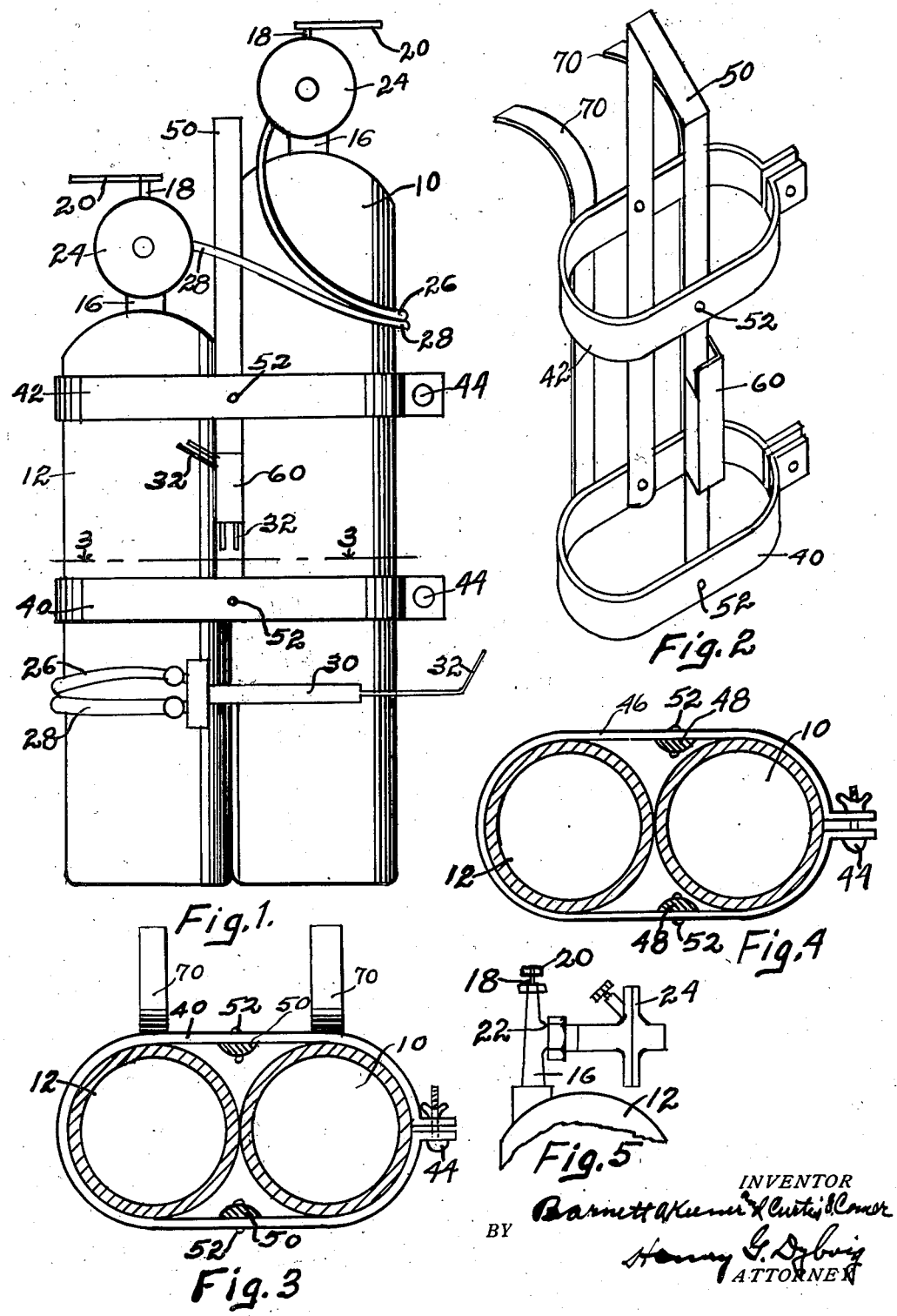

2,313,944

UNITED STATES PATENT OFFICE 2,313,944

PORTABLE WELDING UNIT

Barnett A. Keener, New Lebanon, and Curtis G. Comer, Dayton, Ohio

Application December 16, 1940, Serial No. 370,426

1 Claim. (Cl. 224—25)

This invention relates to acetylene welding devices and more particularly to portable composite welding units.

In the welding industry broadly two types of acetylene welding equipment have been used, the one a permanent installation, usually utilizing leased tanks of acetylene and oxygen, the other a portable unit utilizing tanks which are transported individually, again, generally utilizing rented or leased tanks. These rented or leased tanks contain the gas. These are recharged by the company supplying the gas for the purchase price of the gas. In addition thereto, a small rental fee is paid for the use of the tanks, so that a small user, as for example, a jeweler, finds it necessary in addition to purchasing the gas, to pay a rental fee for the tanks, which increases his overhead, in that the amount of gases used is very limited. With larger users, the rental is not much of an item, as the larger users empty the tanks quite rapidly and exchange these for charged tanks.

The embodiment disclosed herein is primarily intended to eliminate the use of rented tanks. Furthermore, the tanks are mounted in a common support to facilitate handling. When one or both of the tanks are empty, the user of the equipment has the tank or tanks recharged with the necessary gas.

An object of this invention is to provide a composite, portable welding unit that is convenient, dependable, easily handled and at the same time sturdy and efficient.

Another object of this invention is to provide a composite, acetylene welding unit having tanks of unequal size, so selected that under normal operating conditions the gases in both tanks are spent simultaneously. Thus, both may be recharged at the same time. Even though one of the tanks may have a small quantity of unused gas, this quantity is so small that it proves economical to have both tanks charged simultaneously.

Another object of this invention is to provide a composite acetylene welding unit having two tanks for gases, each of which has substantially the same initial pressure, so that the same type of pressure regulator may be used on the tanks, thereby reducing the cost of production.

Other objects and advantages reside in the construction of parts, the combination thereof and the mode of operation, as will become more apparent from the following description.

In the drawing,

Figure 1 discloses a side elevational view of a composite welding unit.

Figure 2 is a perspective view of the bail and the support for the welding tanks, as seen when the tanks are removed.

Figure 3 is a transverse cross sectional view, taken substantially on the line 3—3 of Figure 1.

Figure 4 discloses a cross sectional view of a modification wherein the ball or handle is attached to the hoops in line with the center of gravity, rather than the geometric center of the hoops.

Figure 5 is a fragmentary detail view of the valve mechanism.

As stated above, the common system used in some sections of the country utilizes leased tanks charged with the necessary gases for welding. In the device disclosed herein a composite unit is used which includes privately owned tanks that are supported in a common support, provided with a bail so that the unit may be transported from one place to another manually.

Referring to the drawing, a tank 10 is used for supplying acetylene gas. In addition thereto, an oxygen tank 12 is charged with oxygen for supplying the necessary oxygen to be intermixed with the acetylene gas to provide properly mixed fuel of combustion, so as to have a substantially complete chemical reaction with all of the gases.

The tanks 10 and 12 preferably differ in size, so that there is the proper ratio of oxygen to acetylene at substantially the same pressure for complete combustion, said tanks when charged being of unequal weights. Thus, the gases in the two tanks are consumed at the same relative rate. By this arrangement, the tanks may be recharged simultaneously.

Each of these tanks is provided with an outlet valve 16. Each valve 16 is provided with a valve stem 18 actuated by a suitable wrench 20. The valves are generally closed when the welding device is not in use. Each of the valves is provided with a radially disposed nipple 22, having interconnected thereto the pressure regulating valve 24. These pressure regulating valves are identical for the two tanks. This has been made possible by utilizing comparatively low pressure on the gases in both the acetylene tank and the oxygen tank. By utilizing low pressure in both tanks, it is possible to use low pressure regulating valves for both the acetylene tank and the oxygen tank. This reduces the cost of the complete unit. Generally, the oxygen is supplied under much higher pressure than the acetylene gas. When this is done, it is necessary to utilize one type of valve for regulating the pressure supplied from the acetylene tank and another type of valve for the oxygen tank. Identical regulating valves could be used at higher pressures, providing the pressures of the two tanks are on the same order.

The outlets of the pressure regulating valves 24 are each connected by a hose 26 and 28, connected to the torch 30, provided with a suitable mixing chamber and the necessary valves, as is well known to those skilled in the art. The nozzle 32 of the torch is removable, to permit interchange of nozzles. The pressure regulating valve 24, together with its hose, is removed when recharging the tanks.

The tanks 10 and 12 are secured together by a suitable attaching means. These tanks may be removed for replacement, or they may be removed in order to have the tanks recharged, either simultaneously or individually. The fastening means includes a pair of hoops or bands 40 and 42. These bands encircle both of the tanks and are tightened by suitable bolts 44 extending through outwardly flared ends of the bands. If desirable, the bands may be attached to suitable bolt receiving lugs offset from the geometric center of the bands. In the modification disclosed, the ends of the bands, deflected outwardly or radially, provide suitable shoulders for the retaining bolts. A yoke-shaped bail or handle 50 is connected to the bands by suitable rivets 52, there being one rivet for each of the bands on either leg of the bail. In the embodiment disclosed in Figure 4, hoops 46 and 47 are provided with a bail 48, attached in such a manner that the bail is aligned with the center of gravity, rather than the geometric center. By this arrangement, the bail is offset towards the larger tank, so that the assembly is more easily carried and transported from place to place.

One leg of the bail is provided with a rectangular sheet metal casing 60, having one wall shorter than the others, for retaining extra nozzles of various sizes and dimensions. This casing constitutes a pocket-like structure to retain the nozzles. The bottom of the casing is preferably open, to provide drainage and prevent the accumulation of dirt and debris in the bottom of the pocket formed by the casing 60.

To facilitate recharging and for the sake of safety, the tanks should be removably attached to each other.

This composite unit is preferably made of sufficiently small tanks so that the composite unit may be easily moved by the welder, without the use of a truck and without the use of additional labor. This permits the unit to be carried from place to place. It lends itself to repair work where it is desirable to temporarily use a welding outfit, as for example, in connection with broken airplanes, trucks and other repair jobs. Furthermore, this composite unit may be utilized on construction jobs, where it is desirable to do the welding on the job. Also, it may be used by jewelers, mechanics in small auto repairing garages and other repairmen who require only a small quantity of acetylene welding gas and oxygen from time to time. By this system the cost of the tanks is reduced, so that these are within the reach of the small business man. The investment is comparatively small, the overhead is not increased by a rental fee and the gas is available at all times as required.

In order to facilitate the handling of the unit under certain conditions, as for example firemen in fighting fires, attaching means may be provided with a pair of hook-like members 70 attached to the hooks 40 and 42. The upper ends of the hook-like members 70 are curved, so that the unit may be suspended on a person's back from the shoulders. One hook may extend over the right shoulder, the other over the other shoulder. It has been found that this results in a convenient implement for use by firemen in severing muntin bars, rail bars or making other incisions while fighting a fire. This assembly permits one man to carry the unit suspended from the shoulders and operate the torch without assistance.

In order to avoid excessive weight, all parts are preferably made of light weight material. This includes the tanks which may be made from light weight material, due to the low pressures used in the system.

Although the preferred modification of the device has been described, it will be understood that within the purview of this invention various changes may be made in the form, details, proportion and arrangement of parts, the combination thereof and the mode of operation, which generally stated consist in a device capable of carrying out the objects set forth, as disclosed and defined in the appended claim.

Having thus described our invention, we claim:

In a device for holding a pair of cylindrical tanks of unequal weights, said tanks being arranged side by side and held in position by a plurality of removably mounted elongated flexible split hoops having the sides flattened, said hoops encircling the tanks, the combination including an inverted U-shaped member fixedly attached to oppositely disposed portions of the hoops so that one portion of each hoop is attached to one of the legs and the opposite portion of each hoop is attached to the other leg, said U-shaped member being eccentrically attached to the hoops to balance the weight of the tanks, said U-shaped member holding both portions of the hoops in fixed spaced relation, means for tightening the split hoops for encircling the tanks and inverted J-shaped hooks attached to the hoops on either side of one of the legs of the U-shaped member, said inverted J-shaped hooks cooperating with the U-shaped member to hold the hoops in fixed spaced relation with each other, said hooks being adapted to be supported upon the shoulders of the person for carrying the device on his back.

BARNETT A KEENER.
CURTIS G. COMER.